United States Patent [19]

Campbell et al.

[11] 4,158,331
[45] Jun. 19, 1979

[54] CENTER PIVOT DISPENSING APPARATUS

[75] Inventors: Willis R. Campbell, Ephrata; John H. Freimuth, New Holland, both of Pa.

[73] Assignee: Sperry Rand Corporation, New Holland, Pa.

[21] Appl. No.: 894,458

[22] Filed: Apr. 7, 1978

[51] Int. Cl.² ............................................. B65B 13/18
[52] U.S. Cl. ............................................. 100/5
[58] Field of Search ................... 100/5, 13, 88; 56/341, 56/342, 343

[56] References Cited

U.S. PATENT DOCUMENTS

| | | | |
|---|---|---|---|
| 2,336,491 | 12/1943 | Luebben | 100/5 |
| 3,064,556 | 11/1962 | Luebben | 100/5 |
| 3,968,632 | 7/1976 | Gaeddert | 56/341 |
| 4,009,559 | 3/1977 | Mast | 100/88 |
| 4,022,120 | 5/1977 | McAllister | 100/5 |
| 4,023,479 | 5/1977 | McAllister | 100/5 |
| 4,072,095 | 2/1978 | Campbell | 100/5 |

Primary Examiner—Billy J. Wilhite
Attorney, Agent, or Firm—Ralph D'Alessandro; John B. Mitchell; Frank A. Seemar

[57] ABSTRACT

In a crop roll forming machine which forms large cylindrically shaped bales in a bale forming region and wraps the bales with a binding material and which further has a wrapping means for controlling the wrapping of the completed bale there is provided at least a first and a second binding material dispensing means adjacent the bale forming region connected to the wrapping means so that upon actuation of the wrapping means the first dispensing means is driven across a portion of the bale forming region in a first predetermined path and the second dispensing means is driven in a second predetermined path. The predetermined paths are adjacent the completed bale to effect the wrapping of the bale substantially across its length as the bale is rotated by the bale forming means of the crop roll forming machine.

15 Claims, 5 Drawing Figures

CENTER PIVOT DISPENSING APPARATUS

BACKGROUND OF THE INVENTION

This invention relates to the twine wrapping mechanism commonly found in a crop roll forming machine and, more particularly, to the wrapping means employed to place a desired binding material about the periphery of a completed crop roll by the twine wrapping mechanism.

Recently the practice of harvesting crop materials, such as hay, alfalfa, or corn stover, by forming such crop materials into large cylindrically shaped rolls using large roll forming machines has become increasingly popular and economically advantageous in the agricultural industry. The formation of crop materials into large, compact cylindrical rolls, rather than rectangular bales as formerly done, permitted the crop material to be deposited in roll form and left in fields for extended periods of time since the rolled material tended to provide a self-shedding protective covering from inclement weather. The ability to leave these rolled bales in fields thus obviated the formerly required additional steps of gathering the rectangular bales and transporting them to a storage area protected from the elements.

The forming of crop material into compact rolls itself is not new. The origins can be traced back 30 or 40 years to the small cylindrical bale of hay or other fiberous material produced by the type of machine illustrated in U.S. Pat. No. 2,336,491, dated Dec. 14, 1943. The rolls of crop material produced by this type of machine, in the context of the current agricultural marketplace factors, suffered from the principal disadvantage of producing rolls of such small diameter that excessive spoilage from weathering occurred around the periphery of the roll in comparison to the overall diameter of the roll when such rolls were stored in the field.

A later type of machine produced generally cylindrically shaped rolls of crop material by rolling the material along the ground until a roll of desired size was obtained. Crop rolls of this type, produced by machines of the type disclosed in prior U.S. Pat. No. 3,110,145, dated Nov. 12, 1963, suffered several inherent disadvantages because of the technique that was used to form them. This technique permitted an undesirable amount of crop material to be left upon the ground without being included in the crop roll. Additionally, dirt, clods of earth, stones and the like were picked up by the roll and included therein.

The latest and currently most successful type of machine forming crop rolls picked up a swath or windrow of crop material from the field and deposited it onto a lower conveyor. The conveyor then transported the material to a roll forming region where an apron or flight of belts, usually positioned above and adjacent the conveyor, moved in a suitable direction to rotate the crop material and form a large, compact cylindrical bale. Variations of the type of machine utilizing this principle are illustrated in U.S. Pat. No. 3,859,909 to Mast dated Jan. 14, 1975, and U.S. Pat. No. 3,722,197 dated Mar. 27, 1973.

All of the above-cited crop roll forming machines utilized in some form crop material binding means to wrap the various sized compact crop rolls. The binding material commonly took the form of twine and the binding means, accordingly, became known as twine wrapping means or apparatus. The wrapping means was used in a twine wrapping cycle that included the steps of feeding the twine, wrapping the completed roll or bale and severing the twine prior to ejecting the roll or bale from the machine. Generally, the twine wrapping means employed by these machines included an elongated tube which oscillated in a predetermined path across the bale forming region to dispense the binding material as the material was wrapped about the bale. Automatic twine wrapping means that serially undertook the previously mentioned three steps without any operator involvement have been used in the art on machines used to form cylindrical rolls of crop material, as well as hydraulically or electrically powered means requiring manual activation and completely manually operated twine wrapping means. Operators and manufacturers of the more recent large roll forming machines quickly realized that the less time required for the twine wrapping cycle, the more time there would be for gathering crop material from the field to form completed crop rolls.

The current increasing popularity of large crop roll forming machines has seen their use broaden from merely rolling wintering forage for livestock to rolling high protein crops. Therefore, these machines have been the focal point of many ideas for developing twine wrapping means or apparatus that will appreciably decrease the amount of time required for the twine wrapping cycle, as well as active operator involvement in the cycle. Regardless of whether the twine wrapping means is manual, powered or automatic, the time required to complete the cycle is directly a function of the amount of time it takes to dispense the binding material about the periphery of the completed crop roll and then cut the material. When only a single dispensing means is used to oscillate across the bale forming region to dispense binding material, the time required will necessarily be longer than if multiple dispensing means of some type are used to bind the full length of a completed crop roll. Accordingly, it was found, as will be shown and described in detail hereafter, that the use of multiple elongated dispensing tubes that oscillate simultaneously across distinct portions of the entire length of a completed crop roll substantially decrease the length of time required for the twine wrapping cycle to be completed. It also was found that to obtain the optimum benefit from the instant invention. These multiple dispensing tubes require the corresponding use of multiple binding material severing means.

The multiple dispensing tubes, as well as the severing means, must be synchronized in operation so that the strands of binding material dispensed from the elongated dispensing tubes are wrapped about the completed crop roll and severed at approximately the same instant in time so that the twine wrapping cycle may be promptly terminated and the completed roll ejected from the crop roll forming machine. The multiple dispensing tubes and the multiple severing means are optimally employed with any type of a powered twine wrapping means that can easily drive the multiple dispensing tubes and activate the multiple severing means. In the context of the present invention they have been specifically designed to function with automatic twine wrapping means to effect the binding of the completed crop roll in the least amount of time possible.

The foregoing problems are solved in the design of the apparatus comprising the present invention by providing multiple twine dispensing tubes that are center pivoted and driven by an appropriate power source to dispense a binding material across the entire periphery of a completed crop roll.

SUMMARY OF THE INVENTION

It is an object of the present invention to provide an improved binding material dispensing means that utilizes a plurality of elongated tubes which move in predetermined and generally oscillatory paths to cause the binding material to be dispensed about the periphery of a completed crop roll.

It is another object of the present invention to provide an improved binding material dispensing means that utilizes a plurality of elongated dispensing tubes which are driven in synchronization across the length of a completed crop roll.

It is a further object of the present invention to provide an improved binding material dispensing means that utilizes a plurality of elongated dispensing tubes, the first one of which is driven through a predetermined generally oscillatory path and which serves to drive any additional elongated dispensing tubes through corresponding predetermined paths.

These and other objects and advantages are obtained by providing a center pivoted binding material dispensing means that upon actuation of the wrapping means causes a first dispensing means to be driven across a bale forming region in a first predetermined path and correspondingly drives a second dispensing means in a second predetermined path, the predetermined paths being adjacent the completed crop roll to effect the binding of the crop roll across its entire length with the binding material while crop roll is rotated by bale forming means.

BRIEF DESCRIPTION OF THE DRAWINGS

The advantages of this invention will become apparent upon consideration of the following detailed disclosure of the invention, especially when it is taken in conjunction with accompanying drawings wherein.

DETAILED DESCRIPTION OF THE PREFERRED EMBODIMENT

Figure 1:
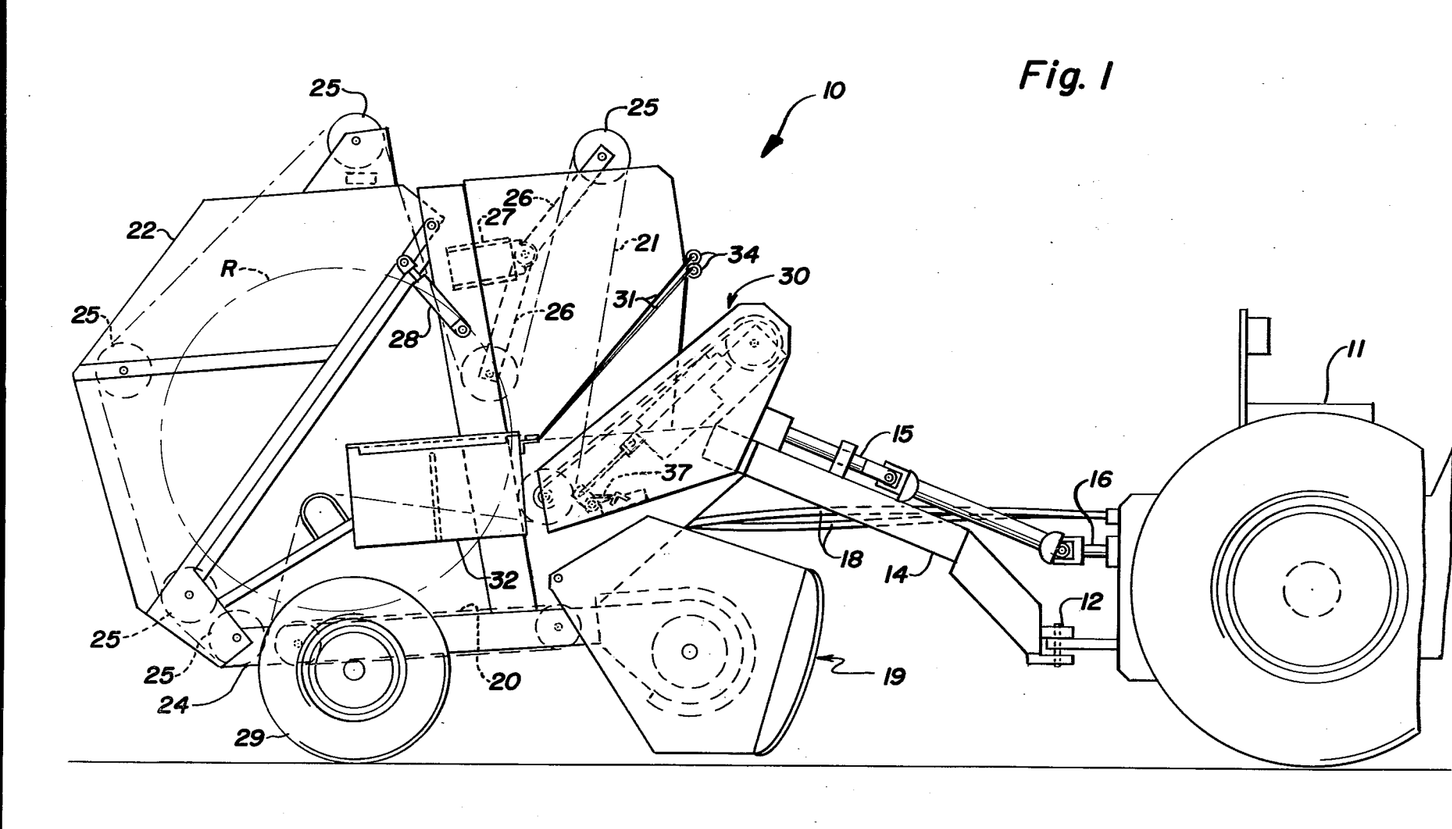
FIG. 1 is a side elevation of a crop roll forming machine illustrating the general location of the instant invention in its operational environment.

Referring generally to FIG. 1 there is shown a crop roll forming machine 10 of the type generally shown in U.S. Pat. No. 3,859,909 to Mast, dated Jan. 14, 1975, connected to a towing vehicle, such as tractor 11, by an appropriate hitch 12 and roll forming machine tongue 14. A power take-off shaft 15 connects the tractor power take-off 16 with the mechanically driven operational components of the crop roll forming machine 10. Hydraulic lines 18 connect the tractor hydraulic power source (not shown) with the hydraulically operable components of the roll forming machine 10. The roll forming machine 10 has a crop pickup, indicated generally by the numeral 19, which gathers the crop material from the field and delivers it to a lower apron, indicated generally by the numeral 20, which conveys the material rearwardly into contact with the upper bale forming means 21. Upper bale forming means 21 is mounted to an upper and lower frame, indicated generally by the numerals 22 and 24, respectively by means of a series of sprockets and guide rollers shown generally by the numeral 25. Upper bale forming means 21 is extensible by means of a pair of takeup arms 26 mounted on both sides of the machine 10 by brackets 27 which permit the upper bale forming means 21 to be fed out around the ever expanding periphery of the crop roll as it is formed within a bale forming region defined generally by the upper bale forming means 21 and the lower apron 20. Upper frame 22 is pivotably raisable at the completion of the twine wrapping cycle for ejection of the completed crop roll R by a pair of hydraulic cylinders 28, only one of which is shown. The crop roll forming machine 10 is mounted on a pair of wheels 29, only one of which is shown.

Figure 2:
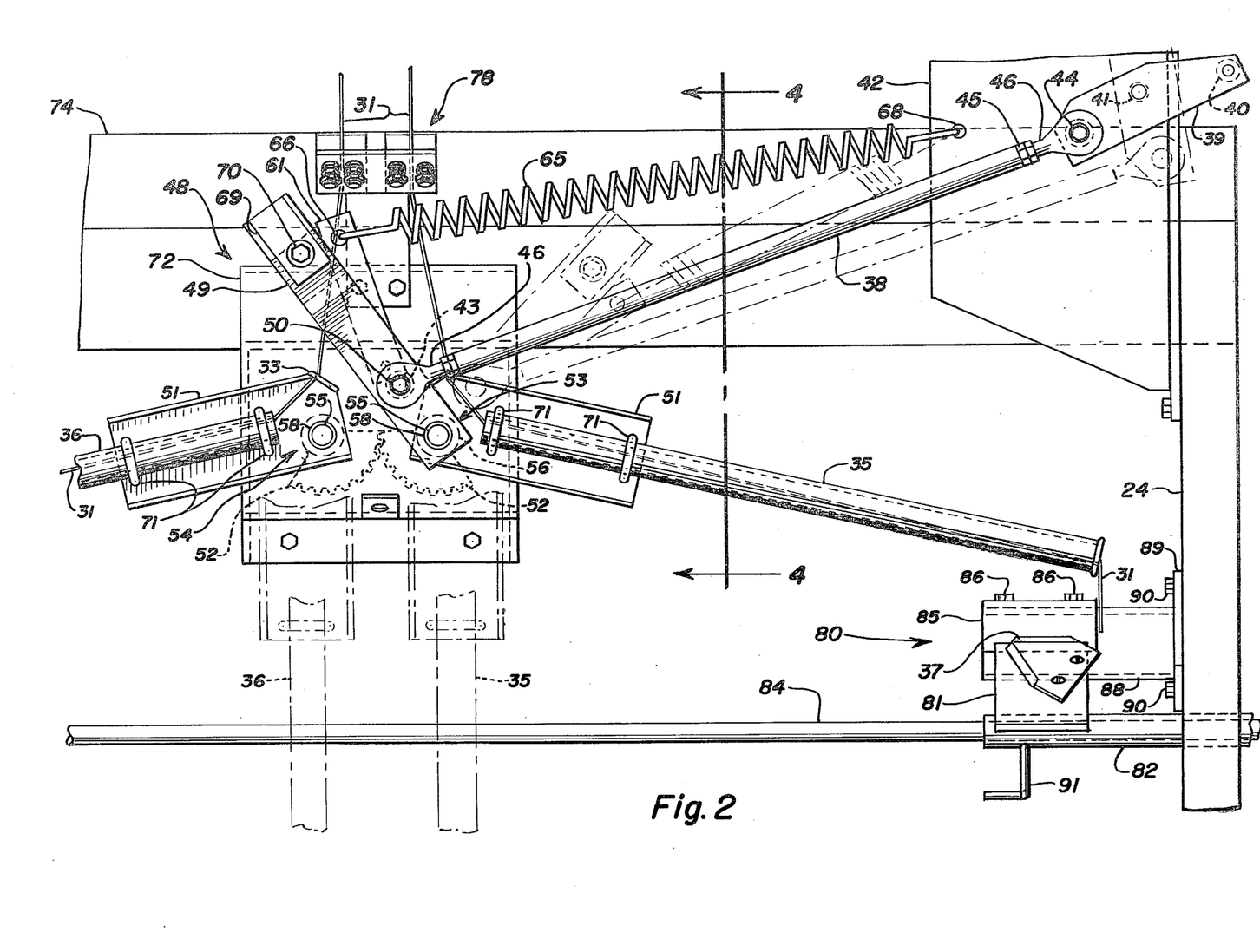
FIG. 2 is a fragmentary top plan view of the front portion of a roll forming machine showing the center pivoted dispensing means.

Twine wrapping apparatus, indicated generally by the numeral 30, is mounted to the side of lower frame 24 in a suitable manner. The binding material 31 is dispensed from binding material storage and dispensing containers 32 suitably affixed to the side of lower frame 24. The binding material 31 is guided by a suitable number of eyelets 34 through guide rings 33, only one of which is shown, to the twine dispensing tubes 35 and 36 of FIG. 2. The cutting blades 37 of twine wrapping apparatus 30 sever the binding material at the conclusion of the twine wrapping cycle, only one blade of which is shown in FIG. 2. A detailed description of the operation and structure of the cutting blades 37 is given in the concurrently filed co-pending application Ser. No. 894,456, entitled "Independently Controlled Twine Knives" of J. S. Richardson, assigned to the assignee of the present invention.

Figure 3:
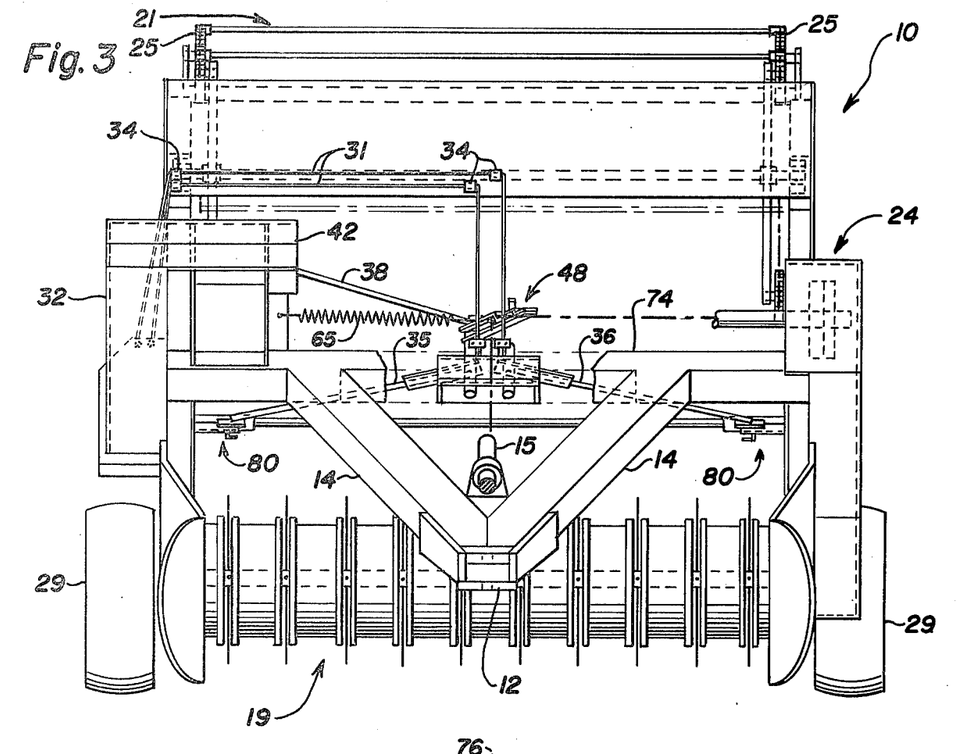
FIG. 3 is a front elevation of a crop roll forming machine having a partial cutaway to show the center pivoted dispensing means.

The twine or binding material dispensing means is shown in greatest detail in FIG. 2 and partially in FIG. 3 where a portion of the drive means for the crop roll forming machine 10 has been cut away. Referring specifically then to FIG. 2, it is seen that a drag link 38 is connected to a pivotable plate 39 with a roller 40 at the end nearest the control means (not shown) of the twine wrapping apparatus 30, shown and described in detail in concurrently filed co-pending application Ser. No. 894,457, entitled "Improved Automatic Twine Wrapping Apparatus" of Freimuth et al, assigned the assignee of the present invention and hereby specifically incorporated by reference herein. Pivotable plate 39 rotates about a stub shaft 41, which extends through the underside of housing plating 42, as the roller 40 traverses the curvilinear periphery of the rotatable cam plate of the twine wrapping apparatus 30 (not shown). Drag link 38 is secured to the end of the cam follower link 39 by a retaining bolt 44 and appropriate washers and lock nuts (not shown). Drag link 38 is adjustable by means of adjusting nuts 45 fitted over threaded end portions indicated generally by the numeral 46 at both ends of the drag link 38.

At the end opposite pivotable link 39, drag link 38 connects with the wrapping means indicated generally by the numeral 48. That opposing end of drag link 38 is rotatably fastened to driven link 49 by means of retaining bolt 50, lock washers and locking nuts (both of which are not shown) or other suitable rotatable fastening means. Driven link 49 is rotated about retaining bolt 50 in response to the movement of drag link 38 as cam follower roller 40 traverses the curvilinear surface of the cam plate (not shown). Driven link 49 is connected to the twine dispensing tubes 35 and 36 by means of tube mounting plates 51 and intermeshing involute spur gears 52. The rotation of the driven link 49 about retaining bolt 50 allows the intermeshing involute gears 52 to be driven to cause journals, indicated generally by the numerals 53 and 54, to rotate and thereby jointly force the dispensing tubes 35 and 36 downwardly in an arcuate path across the path of the bale forming region.

Figure 4:
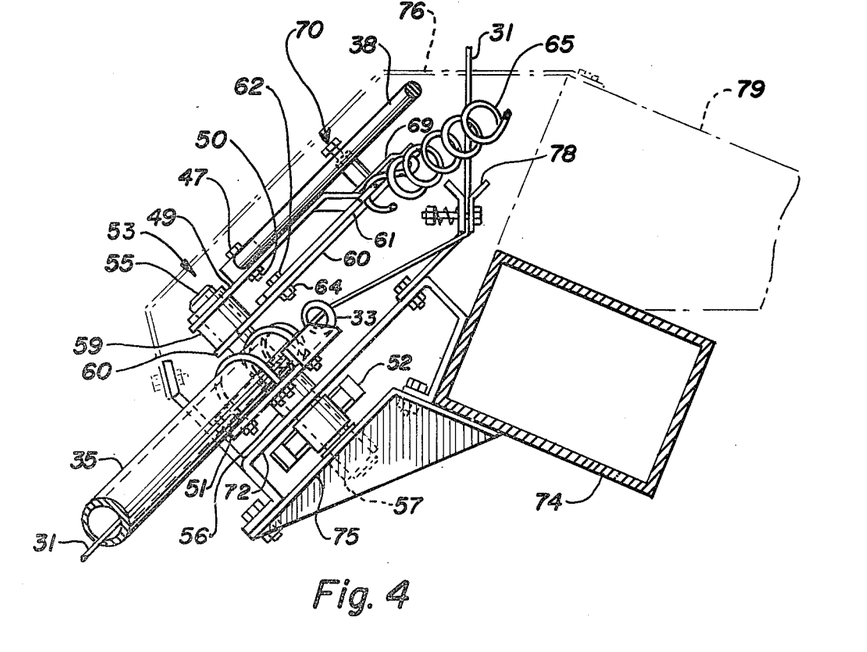
FIG. 4 is a side elevation taken along the lines 4—4 of FIG. 2.

Journals 53 and 54 include shafts 55, bushings 56 and snap rings 58, as shown in FIG. 2. Spur gears 52 are held on shafts 55 by retaining collars 57, one of which is seen in FIG. 4. As best shown in FIG. 2, journal 53 is rotated by the action of drag link 38 and driven link 49, thereby causing twine dispensing tube 35, fastened to its mounting plate 51, to follow a generally oscillatory predetermined path across the bale forming region defined generally by the sides of lower frame 24 and upper bale forming means 21. Twine dispensing tube 35 transfers its oscillatory motion to twine dispensing tube 36 through involute spur gears 52, which are intermeshed in a fashion that permits the twine dispensing tubes 35 and 36 to follow generally corresponding oscillatory paths in synchronized movement to dispense binding material 31.

Journal 53, best seen in FIG. 4, has a spacer bushing 59 between driven link 49 and breakaway link 60. Breakaway link 60 is fastened to a biasing link 61 by a bolt 62 and retaining nut 64 in a manner that allows the biasing link to pivot thereabout. The opposite end of biasing link 61 has a spring 65 connected through an aperture 66, as shown in FIG. 2. Spring 65 is connected at its other end to housing plating 42 through aperture 68. Spring 65 serves to supply the proper predetermined amount of tension through biasing link 61 to the driven link 49 and finally dispensing tubes 35 and 36 as the tubes oscillate across the bale forming region.

Figure 5:
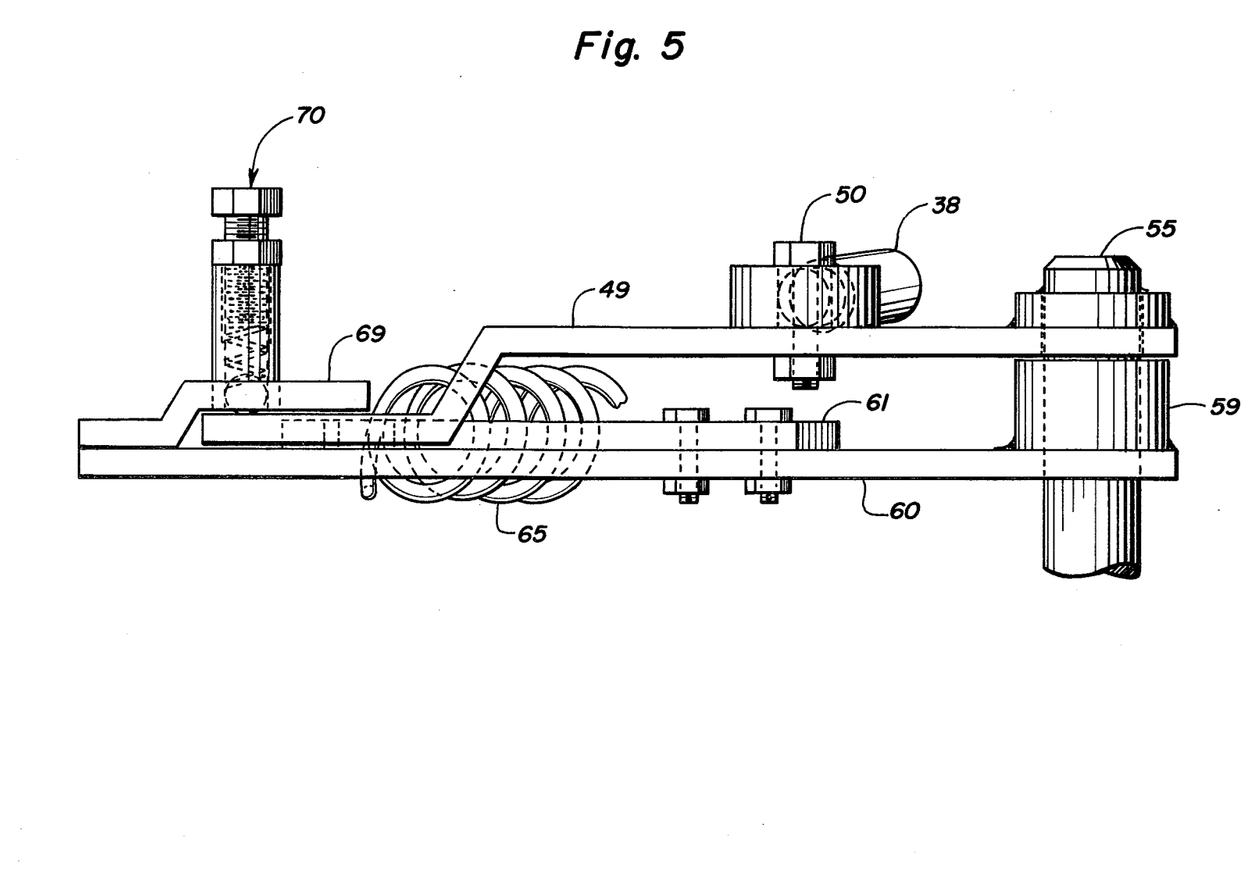
FIG. 5 is a side elevation of the breakaway 70 and the associated elements of the center pivoted dispensing means.

Breakaway link 61 has a bracketing link 69 fixedly fastened to an end of breakaway link 60 in a suitable fashion, such as by welding, as seen in FIG. 4. Bracket 69 has affixed thereto a breakaway, indicated generally by the numeral 70, which maintains the cooperative functional integrity of the components of the wrapping means 48 and thus prevents any damage from occurring to the wrapping means 48 should the twine dispensing tubes 35 and 36 encounter any impassable obstacles during their travel along their predetermined paths. The breakaway 70, shown in FIG. 5, is not described in further detail at this time since it is old in the art and is described in detail in U.S. Pat. No. 4,072,095 to Campbell et al, assigned to the assignee of the present invention.

Twine dispensing tubes 35 and 36 are fastened to tube mounting plates 51 by means of welded brackets 71, best seen in FIG. 2. Binding material guide rings 33, only one of which is shown, are mounted to each of the tube mounting plates 51. The entire wrapping means 48 is mounted to a mounting plate 72, which is in turn fastened to a transverse support frame beam 74 by fastening bracket 75, best seen in FIG. 4. Wrapping means mounting plate 72 has a shielding 76 affixed to it to protect the wrapping means 48 from the elements and to prevent any undesirable foreign matter from accumulating thereon. Mounting plate 72 also has mounted thereon a tensioning means 78 to apply the proper amount of tension to the binding material 31 as it is fed across the bale forming region by the twine dispensing tubes 35 and 36. Tensioning means 78 is not described any further at this point since the operation and structure is wholly conventional and well known in the art. The mounting plate 72, tensioning means 78 and shielding 76 are secured to their respective supporting structures by appropriate fastening means, such as bolts and nuts. The fastening bracket 75 is fixedly fastened to transverse support beam 74 by welding. As shown in FIG. 4, the shielding 76 is fastened at its forwardmost portion to gearbox shielding 79 which covers a gearbox (not shown) mounted on transverse support beam 74.

Cutting blades 37, only one of which is shown in detail in FIG. 2, are part of severing means 80. Severing means 80 is shown and described in detail in the concurrently filed, co-pending application Ser. No. 894,456, entitled "Independently Operated Twine Knives" of J. S. Richardson, assigned to the assignee of the present invention and hereby specifically incorporated by reference herein. Briefly, cutting blades 37 are mounted to rotatable brackets 81 in a suitable fashion, such as by bolts or rivets. Brackets 81 are suitably fastened to rotatable sleeves 82 which are concentrically mounted about elongated rod 84. A striker plate 85 is fastened by means of bolts 86 to a side frame bracket 88. Bracket 88 is fixed to the side of lower frame 24 by a mounting plate 89 and bolts 90. Sleeves 82 have an L-shaped guide bracket 91 to prevent the binding material 31 from overrunning the ends of the completed crop roll R as the binding material is dispensed from dispensing tubes 35 and 36 about the periphery of the crop roll R. The binding material 31 is wrapped about the periphery of the completed crop roll R when the end of each strand of binding material 31 is brought into frictional contact with the rotating crop roll R as the twine dispensing tubes 35 and 36 are brought to their lowest position, shown in phantom in FIG. 2. This frictional contact causes the binding material 31 to be pulled from the twine dispensing tubes 35 and 36 as the tubes oscillate generally along their predetermined path across the length of the completed crop roll R.

In operation, the wrapping means 48 are activated by the control means of the twine wrapping apparatus when the cam follower roller 40 of pivotal plate 39 traverses the curvilinear periphery of the rotatable cam plate of the control means. This action causes the drag link 38 to drive driven link 49 which is journalled to the lead twine dispensing tube 35. The twine dispensing tube 35 is thereby started in motion and permits the biasing spring 65 through biasing link 61 to cause the tube 35 to be quickly snapped generally downwardly from a home position to its phantomed lowest position in a predetermined path. At the same time, through the transfer of power via intermeshing spur gears 52, the twine dispensing tube 36 is correspondingly driven from its home position. The twine tubes 35 and 36 are thus spring assisted until they reach their fully downwardly extended position from which they started their return along their predetermined and generally oscillatory paths to the home position. During this return portion of the oscillating cycle, the binding material 31, having been released from between the cutting blades 37 and striker plates 85, is fed out along the periphery of the rotating crop roll R and wrapped thereabout. Upon the return of the twine dispensing tubes 35 and 36 to their respective home positions, the severing means 80 is activated to cause the cutting blades 37 to be rotated into cutting engagement with the striker plates 85, thereby severing the binding material.

It has been previously stated that the multiple twine dispensing tubes 35 and 36 are equally well employed with any type of a power source that has the capacity to drive them. Alternative power sources that are entirely self contained units, such as electrical motors or hydraulic cylinders, as opposed to having power being supplied through the upper blade forming means 21 from the power takeoff shaft 15, can be connected to the drag link 38 at the aperture for retaining bolt 44 and either automatically or manually controlled. Examples of such alternative power sources previously utilized on round balers are shown in U.S. Pat. No. 4,022,120, dated May 10, 1977 to McAllister, illustrating an electrical motor, and U.S. Pat. No. 4,072,095, dated Feb. 7, 1978 to Campbell et al., illustrating an hydraulic cylinder. Other suitable drive connections to the driven link 49 easily can be employed to utilize these alternative power sources.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass obvious changes in the details, materials and the arrangement of parts which will occur to one of skill in the art upon a reading of this disclosure.

Having thus described the invention, what is claimed is:

1. A crop roll forming machine for forming large cylindrically shaped bales and for wrapping the bales with a binding material which comprises:
   (a) a mobile frame;
   (b) bale forming means movably mounted to the frame;
   (c) a bale forming region defined generally by the frame and the bale forming means;
   (d) wrapping means mounted to the frame for controlling the wrapping of a completed bale with the binding material;
   (e) at least a first and a second binding material dispensing means adjacent the bale forming region connected to the wrapping means;
   (f) a power transfer means connecting the first and the second dispensing means;
   (g) drive means mounted to the frame and drivingly connected to the bale forming means and the wrapping means, the drive means comprising a driven link having a first and a second end, the link being pivotably fastened at the first end to the power transfer means;
   (h) a rotable curvilinearly surfaced cam plate operably connected to the wrapping means; and
   (i) a roller plate connected to the driven link at the second end and in driven engagement with the rotatable curvilinearly surfaced cam plate so that upon actuation of the wrapping means the driven link drives the first dispensing means across a portion of the bale forming region in a first predetermined path and the second dispensing means in a second predetermined path, the paths being adjacent the completed bale and adjacent each other so as cumulatively to be substantially co-extensive with the width of the bale forming region to thereby effect the wrapping of the bale substantially across its length in response to the movement of the roller plate about the curvilinear surface of the cam plate as the bale is rotated by the bale forming means.

2. The crop roll forming machine according to claim 1, wherein the wrapping means further comprises a breakaway mechanism interconnecting the driven link and the first and second dispensing means being operable to transmit a predetermined torque load to the first and second dispensing means for driving the first and second dispensing means and being inoperable to transmit torque loads above the predetermined torque load.

3. The crop roll forming machine according to claim 2, wherein the wrapping means further comprises at least one adjustable tensioning means for the binding material so that upon activation of the first and second dispensing means the binding material is passed therethrough under a resistive force to effect a tight wrapping of the binding material about the completed crop roll.

4. In a crop roll forming machine of the type having bale forming means movably mounted to a mobile frame, a bale forming region within the frame defined generally by the bale forming means, wrapping means supported by the frame for binding a completed crop roll with a binding material and drive means operably connected to the wrapping means and the bale forming means, the improvement in the wrapping means comprising:

at least a first and a second binding material dispensing means cooperatively associated with the drive means and adjacent the bale forming region having power transfer means operably connected therebetween, the drive means comprising a roller plate and a driven link, the driven link having a first and a second end and being pivotably fastened at the first end to the first dispensing means and at the second end to the roller plate, the roller plate being in driven engagement with a rotatable curvilinearly surfaced cam plate so that upon actuation of the wrapping means the first dispensing means is driven across a portion of the bale forming region in a first predetermined path and the second dispensing means is driven across the bale forming region in a second predetermined path, the predetermined paths being adjacent the completed crop roll to effect the binding of the crop roll substantially across its length with the binding material in response to the movement of the roller plate about the curvilinear surface of the cam plate as the crop roll is rotated by the bale forming means.

5. The crop roll forming machine according to claim 4, wherein the first and second predetermined paths are adjacent to each other and together are substantially co-extensive with the width of the bale forming region.

6. The crop roll forming machine according to claim 4, wherein the first and second predetermined paths are adjacent to each other and together are substantially co-extensive with the width of the bale forming region.

7. The crop roll forming machine according to claim 6, wherein the wrapping means further comprises at least one adjustable tensioning means for the binding material so that upon activation of the first and second dispensing means the binding material is passed therethrough under a resistive force to effect a tight wrapping of the binding material about the completed crop roll.

8. In a crop roll forming machine of the type having bale forming means movably mounted to a mobile frame, a bale forming region within the frame defined generally by the bale forming means, wrapping means supported by the frame for binding a completed crop roll with a binding material and drive means operably connected to the wrapping means and the bale forming means, the improvement in the wrapping means comprising:

at least a first and second binding material dispensing means cooperatively associated with the drive means and adjacent the bale forming region having power transfer means operably connected therebetween, the drive means comprising a roller plate and a driven link, the driven link having a first and a second end and being pivotably fastened at the first end to the first dispensing means and at the second end to the roller plate, the roller plate being in driven engagement with a rotatable curvilinearly surfaced cam plate so that upon actuation of the wrapping means the first dispensing means is driven across a portion of the bale forming region in a first predetermined path and correspondingly drives the second dispensing means in a second predetermined path, the predetermined paths being adjacent the completed crop roll to effect the binding of the crop roll substantially across its length with the binding material in response to the movement of the roller plate about the curvilinear surface of the cam plate as the crop roll is rotated by the bale forming means.

9. The crop roll forming machine according to claim 8, wherein the wrapping means further comprises a breakaway mechanism interconnecting the driven link and the first dispensing means and operable to transmit a predetermined torque load to the first dispensing means for driving the first dispensing means and inoperable to transmit torque loads about the predetermined torque load.

10. A crop material binding apparatus adapted to be mounted on a mobile crop roll forming machine of the type having a bale forming region defined by a movable bale forming means, a first drive means operably connected to the bale forming means and a second drive means, the binding apparatus comprising:

a first and a second rotatable binding material dispensing means drivingly interconnected to a power transfer means which is adapted to be operably connected to the second drive means, the first drive means comprising a roller plate, the roller plate being in driven engagement with a rotatable curvilinearly surfaced cam plate, such that when mounted on the crop roll forming machine upon actuation of the second drive means the first dispensing means is driven in a first generally oscillatory predetermined path and the second dispensing means is dirven in a second generally oscillatory predetermined path, the predetermined paths being adjacent the crop roll forming region to effect the binding of the crop roll substantially across its length.

11. The crop material binding apparatus according to claim 10, wherein the first and second predetermined paths are adjacent to each other and together are substantially co-extensive with the width of the bale forming region.

12. The crop material binding apparatus according to claim 11, wherein the first dispensing means is driven in the first predetermined path and via the power transfer means correspondingly drives the second dispensing means through the second predetermined path.

13. A crop material binding apparatus for a crop roll forming machine comprising:
(a) power means having a roller plate, a connecting link and a rotatable curvilinearly surfaced cam plate;
(b) a first and a second binding material dispensing means, the connecting link joining the roller plate and the first dispensing means; and
(c) a power transfer means connecting the first and the second dispensing means and operably connected to the power means so that upon actuation of the power means the first dispensing means is driven in a first predetermined path and the second dispensing means is driven in a second predetermined path in response to movement of the roller plate about the curvilinear surface of the cam plate, the paths being effective to bind a rotatable crop material package of predetermined length and shape.

14. The crop material binding apparatus according to claim 13, wherein the first and second predetermined paths are adjacent to each other and together are substantially coextensive with the length of the crop material package.

15. The crop material binding apparatus according to claim 14, wherein the first dispensing means is driven in the first predetermined path and via the power transfer means correspondingly drives the second dispensing means through the second predetermined path.

* * * * *

UNITED STATES PATENT OFFICE
CERTIFICATE OF CORRECTION

Patent No. 4,158,331    Dated June 19, 1979

Inventor(s) Willis R. Campbell and John H. Freimuth

It is certified that error appears in the above-identified patent and that said Letters Patent are hereby corrected as shown below:

Claim 5, please change the dependency from "Claim 4" to --Claim 1--.

Signed and Sealed this

Twenty-sixth Day of February 1980

[SEAL]

Attest:

SIDNEY A. DIAMOND

Attesting Officer    Commissioner of Patents and Trademarks